(12) United States Patent
Mueller-Wicke et al.

(10) Patent No.: US 12,153,679 B2
(45) Date of Patent: Nov. 26, 2024

(54) AUTOMATIC RANSOMWARE DETECTION WITH AN ON-DEMAND FILE SYSTEM LOCK DOWN AND AUTOMATIC REPAIR FUNCTION

(71) Applicant: International Business Machines Corporation, Armonk, NY (US)

(72) Inventors: Dominic Mueller-Wicke, Weilburg (DE); Stefan Bender, Woerrstadt (DE); Thomas Schreiber, Klein-Winternheim (DE); Kai Boerner, Kelsterbach (DE)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 17/657,642

(22) Filed: Apr. 1, 2022

(65) Prior Publication Data

US 2022/0222345 A1    Jul. 14, 2022

Related U.S. Application Data

(63) Continuation of application No. 16/539,398, filed on Aug. 13, 2019, now Pat. No. 11,328,064.

(51) Int. Cl.
*G06F 21/56* (2013.01)
*G06F 11/07* (2006.01)
*G06F 11/14* (2006.01)

(52) U.S. Cl.
CPC ........ *G06F 21/568* (2013.01); *G06F 11/0793* (2013.01); *G06F 11/1435* (2013.01)

(58) Field of Classification Search
CPC .......................... G06F 11/0793; G06F 11/1435
See application file for complete search history.

(56) References Cited

U.S. PATENT DOCUMENTS 8,676,759 B1 * 3/2014 Zhu ...................... G06F 3/0617
                                                     707/638
9,454,321 B1    9/2016 Smaldone
(Continued)

FOREIGN PATENT DOCUMENTS

CA    2705379 C    8/2016
CN    101019115 B    4/2012
(Continued)

OTHER PUBLICATIONS

Japanese Patent Application No. 2022-507554, Notification of Reasons for Refusal [Translated], drafted Dec. 18, 2023, 4 pgs.
(Continued)

*Primary Examiner* — Clayton R Williams
(74) *Attorney, Agent, or Firm* — Michael A. Petrocelli (57) ABSTRACT

A method and system for detecting ransomware and repairing data following an attack. The method includes, collecting file statistics for files in a file system, identifying an affected file based on collected file statistics, locking down of access to the file system in response to identifying the affected file, undoing of reconcile processing, repairing the affected files, and unlocking access to the file system. The system includes a computer node, a file system, a plurality of disc storage components, a backup client, a backup client, and a hierarchical storage client. The hierarchical storage client is configured to collect file statistics for files in file system, identify affected files based on collected file statistics for the file, lock down of access to the file system in response to an identified affected file, undo reconcile processing, repair the affected file; and unlock access to the file system.

16 Claims, 6 Drawing Sheets

(56) References Cited

U.S. PATENT DOCUMENTS

| | | |
|---|---|---|
| 9,690,501 B1 | 6/2017 | Chopra |
| 10,055,582 B1 | 8/2018 | Weaver |
| 10,715,533 B2 | 7/2020 | Iwanir |
| 10,956,575 B2 | 3/2021 | Harsany |
| 11,170,104 B1 * | 11/2021 | Stickle .................. G06N 20/00 |
| 11,175,998 B2 | 11/2021 | Gu |
| 11,328,064 B2 | 5/2022 | Mueller-Wicke |
| 2013/0179405 A1 | 7/2013 | Bunte |
| 2016/0011816 A1 | 1/2016 | Aizman |
| 2016/0378988 A1 | 12/2016 | Bhashkar |
| 2017/0177867 A1 | 6/2017 | Crofton |
| 2018/0101678 A1 | 4/2018 | Rosa |
| 2018/0157834 A1 | 6/2018 | Continella |
| 2018/0241777 A1 | 8/2018 | Best |
| 2018/0330088 A1 | 11/2018 | Crofton |
| 2018/0351968 A1 | 12/2018 | Macleod |
| 2019/0065788 A1 | 2/2019 | Vijayasankar et al. |
| 2019/0087572 A1 | 3/2019 | Ellam |
| 2019/0108340 A1 | 4/2019 | Bedhapudi |
| 2019/0109870 A1 | 4/2019 | Bedhapudi |
| 2019/0156039 A1 | 5/2019 | Harsany |
| 2019/0188380 A1 * | 6/2019 | Animireddygari ... G06F 21/568 |
| 2019/0235973 A1 | 8/2019 | Brewer |
| 2019/0236274 A1 | 8/2019 | Brenner |
| 2020/0099699 A1 | 3/2020 | Saad |
| 2020/0320015 A1 | 10/2020 | Xie |
| 2020/0342106 A1 | 10/2020 | Chelarescu |
| 2020/0379659 A1 | 12/2020 | Faibish |
| 2021/0012002 A1 | 1/2021 | Rosenthal |

FOREIGN PATENT DOCUMENTS

| | | |
|---|---|---|
| CN | 102667772 A | 9/2012 |
| CN | 104603762 A | 5/2015 |
| CN | 109478220 A | 3/2019 |
| CN | 109815698 A | 5/2019 |
| JP | 2018128910 A | 8/2018 |
| JP | 2018147127 A | 9/2018 |
| JP | 2019505919 A | 2/2019 |
| WO | 2017136073 A1 | 8/2017 |
| WO | 2018156800 A1 | 8/2018 |
| WO | 2021028131 A1 | 2/2021 |
| WO | 2021028740 A1 | 2/2021 |

OTHER PUBLICATIONS

U.S. Appl. No. 16/539,453 Notice of References Cited mailed Apr. 18, 2023 1 pg.
List of IBM Patents or Patent Applications Treated as Related, 2 pages.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.
Mueller-Wicke et al., "Automatic Ransomware Detection With an On-Demand File System Lock Down and Automatic Repair Function," U.S. Appl. No. 16/539,453, filed Aug. 13, 2019.
PCT/EP2020/069531, International filing date Jul. 10, 2020, International Search Report and Written Opinion, mailed Sep. 15, 2020.
Subedi et al., "RDS3: Ransomware Defense Strategy by Using Stealthily Spare Space," Conference Paper, 2017 EEE Symposium Series on Computational Intelligence {SSCI), Nov. 2017, 9 pages.
Notification of Grant for Chinese application number 202080056991. 9, filed Jul. 10, 2020, dated Sep. 24. 2024, 4 pages.

* cited by examiner

AUTOMATIC RANSOMWARE DETECTION WITH AN ON-DEMAND FILE SYSTEM LOCK DOWN AND AUTOMATIC REPAIR FUNCTION

BACKGROUND

The present disclosure relates to file system protection, more specifically to detecting and responding to a malware or ransomware attack on a file system.

Ransomware is a type of malware from cryptovirology that threatens to publish the victim's data or perpetually block access to the data unless a ransom is paid. Simple ransomware may lock the system in a way which is not difficult for a knowledgeable person to reverse. However, more advanced malware uses a technique called cryptoviral extortion, in which it encrypts the victim's files, making them inaccessible, and then demands a ransom payment to decrypt them. In a properly implemented cryptoviral extortion attack, recovering the files without the decryption key is an intractable problem Ransomware attacks are typically carried out using a trojan that is disguised as a legitimate file that the user is tricked into downloading or opening when it arrives as an email attachment. However, some versions can travel between computers without user interaction.

Current solutions only detect a ransomware attack after the entire file system or at least a larger portion (multiple directories) of the file system have been encrypted. To repair the affected files from a ransomware attack a full restore of the file system must be performed. Typically, a full system restore comes from a back-up, if available. However, this takes a lot of time and stops operation of the affected file system. In a worst case scenario the user has no backup, or the encrypted files have been backed up already and loses all the files, or is forced to pay the ransomware attacker to get their files back.

SUMMARY

According to embodiments of the present disclosure a ransomware detection and management system is disclosed. Embodiments of the system includes a computer node, a file system, a plurality of disc storage components, a backup client, a backup client, and a hierarchical storage client. The hierarchical storage client is configured to collect file statistics for files in file system, identify affected files based on collected file statistics for the file, lock down of access to the file system in response to an identified affected file, undo reconcile processing, repair the affected file; and unlock access to the file system. In some embodiments the collected file statistics include collected file access statistics; and collected file deduplication and compression rates. In some embodiments, the hierarchical storage client further comprises an observation and control module (OCM) an observation and control module table (OCMt) an enhanced migration module (EMM), an enhanced file system reconciliation module (EFRM), and an enhanced recall module (ERM). In embodiments, the OCM is configured to register with the file system receive a notification from the file system when a new file is created or an existing file in the file system is changed, notify the EMM of the new file or the changed file; and initiate pre-migration of the new or changed file. In some embodiments, the EMM is configured to calculate deduplication and compression rates for the file during pre-migration of the file, inform the OCM of the deduplication and compression rates, and enter the deduplication and compression rates for the file in an entry for the file in the OCMt. In some embodiments, the EMM is further configured to collect the deduplication and compression rates when a file is migrated. In some embodiments, the EMM is further configured to, generate a block level hash map of a file at a time of first pre-migration, generate a second block level hash map of the file at the time of a second pre-migration of the file, compare the block level hash map with the second block level hash map, determine that a predetermined portion of the compared block level hash maps do not match, and identify the file as affected in response to exceeding the predetermined portion. In some embodiments the OCM is further configured to store the block level hash map of the file in the OCMt. In some embodiments, the OCM is further configured to determine if an abnormal amount of file write accesses have occurred to the file system. In some embodiments, the OCM is further configured to define a watermark of accepted write access to the files in the file system.

According to embodiments of the present disclosure a method for detecting ransomware is disclosed. The method includes, collecting file statistics for files in a file system, identifying an affected file based on collected file statistics, locking down of access to the file system in response to identifying the affected file, undoing of reconcile processing, repairing the affected files, and unlocking access to the file system. In some embodiments, collecting file statistics system includes, collecting file access statistics, and collecting file deduplication and compression rates. In some embodiments, collecting file access statistics includes registering an observation and control module (OCM) with the file system, notifying the OCM when a new file is created or an existing file in the file system is changed, notifying by the OCM an enhanced migration module of the new file or the changed file, and initiating pre-migration of the new or changed file. In some embodiments, the method includes registering by the OCM a change tracking process at the new file or the existing file for a notification when a write access occurs to the new file or the existing file. In some embodiments, the method includes, receiving a notification of a write access, and adding a data associated with the file to an observation and control module table (OCMt). In some embodiments, the method includes, receiving a notification of a second or subsequent write access to the file, and adding data associated with the file the OCMt. In some embodiments collecting file deduplication and compression rates includes calculating by an enhanced migration module (EMM) deduplication and compression rates for the file during pre-migration of the file, informing the OCM by the EMM of the deduplication and compression rates for the file, and entering the deduplication and compression rates for the file in an entry for the file in the observation and control module table (OCMt).

In some embodiments identifying an affected file includes generating a block level hash map of a file at a time of first pre-migration of the file storing the block level hash map of the file in an observation and control module table (OCMt) generating a second block level hash map of the file at a time of a second pre-migration of the file, comparing the block level hash map with the second block level hash map determining that a predetermined portion of the compared block level hash maps do not match, and in response to determining identifying the file as affected. In some embodiments identifying an affected file includes determining if an abnormal amount of file write accesses have occurred to the file system. In some embodiments determining if an abnormal amount of file write accesses have occurred to the file system includes traversing the observation and control module table (OCMt), building a sum of write accesses for files in the OCMt for a most recent observation cycle, building a sum of write access for the files in the OCMt for an observation cycle prior to the most recent observation cycle. In some embodiments determining if an abnormal amount of file write access have occurred to the file system includes traversing the observation and control module table (OCMt), for each file in the table accessed in a previous observation cycle, reading an associated deduplication and compression rate entry for each file from the OCMt as a most recent rate. For each file, calculating a current deduplication and compression rate for the associated file as a current rate, comparing the current rate for each file with most recent rate for the corresponding file from the previous observation cycle, and determining that the associated file has abnormal file access when the current rate is lower than the most recent rate. In some embodiments identifying an affected file includes defining a watermark of accepted write access to the files in the file system.

In some embodiment locking down of access to the file system in response to identifying the affected file includes, traversing the observation and control module table (OCMt) to determine if a threshold number of files have been marked as an affected file, block write accesses to the file system, stopping by an enhanced migration module (EMM) of all migration processing, and stopping by an enhanced filesystem reconcile module (EFRM) all reconcile processing. In some embodiment undoing of reconcile processing includes, writing by an enhanced filesystem reconcile module (EFRM) an undo log of changes to reconciled, determining that reconcile processing at the EFRM has been stopped, and applying the undo log to undo all reconcile activities at a storage server. In some embodiments repairing the affected files includes traversing the observation and control module table (OCMt) identify each file in the OCMt that is marked as an affected file, moving the affected file to a quarantine folder and restoring a most recent version of the affected file from a storage server having a migration time stamp prior to a time stamp associated with a current version the affected file. In some embodiments repairing the affected file includes traversing an observation and control module table (OCMt) identify each file in the OCMt that is marked as an affected file, stubbing the affected file, and linking the stubbed version of the affected file to a version of the affected file in a storage server that was migrated prior to a timestamp associated with a current version of the affected file.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the protection of file systems, and more particularly to the protection of a file system from malware or ransomware attacks. While the present disclosure is not necessarily limited to such applications, various aspects of the disclosure may be appreciated through a discussion of various examples using this context.

A ransomware attack is one of the most disruptive issue that can happen to files in a file system. This can have a significant impact to the file system and file owners. Ransomware attacks can't be detected quick enough to prevent the access loss to files. Typically, the owner of a file system realizes the ransomware attack only after the files are encrypted.

Modern backup software (e.g. IBM Spectrum Protect) is able to detect if the backup rates or the deduplication rates in a file system backup show differences from the normal processing. Unfortunately, this detection happens at the time of the next backup that occurs after the file system was infected. This means that all of files are already encrypted, and it is too late to stop the attack. To repair the affected files a full restore of the file system must be performed. However, this takes a lot of time and stops the production on the affected file system. In a worst case scenario the user has no backup and loses all the files, or is forced to pay the ransomware attacker to get their files back.

Current solutions cannot prevent attacks which affect the whole file system. Current solutions only detect a ransomware attack after the entire file system has been encrypted. In order to repair this file system a full system restore must be restored from a back-up, if available.

The present disclosure addresses the weakness in current protection stems by quickly (near real-time) detecting a ransomware attack, and providing a near real-time reaction to the detected ransomware attack to prevent further encryption of the files and/or file system. The present disclosure further provides for automatic repair of the files that were encrypted prior to the detection of the ransomware attack. Further, the present disclosure can interlock or coordinate with a virus scanner to automatically repair files that have been infected by viruses or other corruptions.

Figure 1:
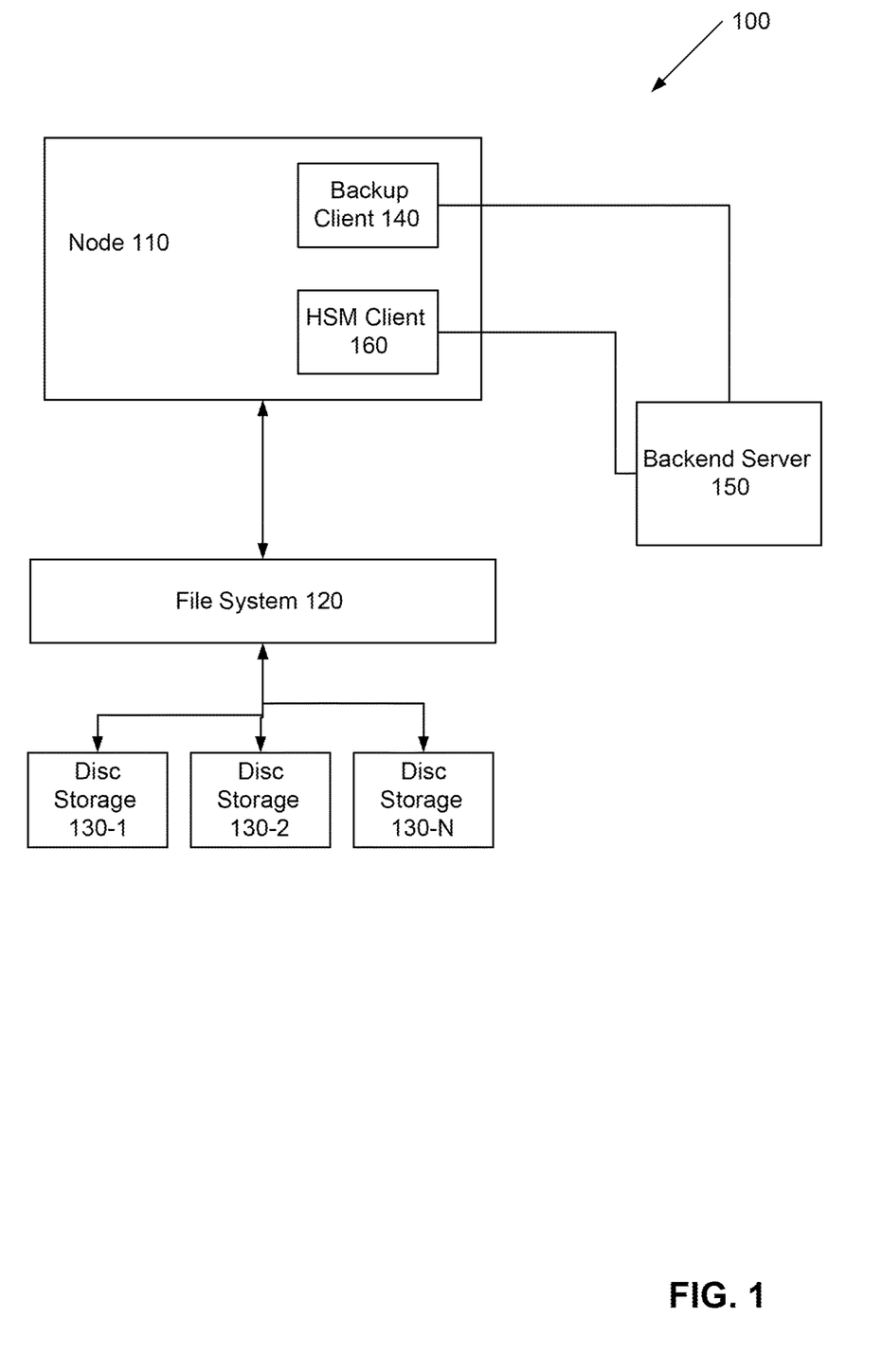
FIG. 1 is a block diagram illustrating system for providing back-up architecture with ransomware detection and management according to illustrative embodiments.

FIG. 1 is a block diagram illustrating system for providing back-up architecture with ransomware detection and management according to illustrative embodiments. The backup system 100 employs a hierarchical storage management solution (HSM) to manage the files. Backup system 100 includes a computer node 110, a file system 120, disc storage components 130-1, 130-2, 130-N (collectively disc storage component 130), backup client 140, backend server 150, and hierarchical storage management client 160 (HSM Client 160).

Briefly in in FIG. 1, the backup client 140 runs on the compute node 110. The compute node has a local mount of the file system 120 and has access to the disk storage components 130 via a network. The backup client 140 component 140 is connected to backend server 150. HSM Client 160s are typically installed on one (or in a cluster environment on multiple) compute node(s) 110. The HSM Client 160 reads the data from the file system 120 that is mounted on the compute node(s) 110 and sends the file data via migration to the backend server 150. The HSM Client 160 runs on the compute node 110. The compute node has a local mount of the file system 120 and has access to the disk storage components 130 via a network. The HSM Client 160 component 160 is connected to backend server 150.

A hierarchical storage management solution typically is a virtual expansion of the file system 120 space by introducing additional hierarchical storage tiers. The reason for introducing storage tiers is to store large amounts of data at lower cost and higher efficiency than traditional rotating magnetic disks. In many cases HSM tiered environments are comprised of different flash or solid state drives (SSD) (tier 0) and hard disk drives (HDD) (tier 1-N–1) classes, and tape as the last tier (tier N) in the hierarchy. The process of moving files between tiers is called migration and recall. Migration means to move the file data to the next lower tier and replace the data on the higher tier with only the metadata that is required to identify the new location of the file data in the lower tier for later recall. The metadata is typically called a "stub file" and consumes no space. Recall means to move the data back to the higher tier in the storage hierarchy. The physical location of the file data is transparent for the user of the file system 120 and the stored data. An HSM solution doesn't distinguish between different file versions. A change to file data requires the recall from the lower tiers to an online tier. These functions are implemented by the HSM Client 160 component 160 through the corresponding migration module and recall module (illustrated in FIG. 2)

In terms of migrating files from a higher tier to a lower tier, a Unix HSM knows three different file migration states, resident, premigrated, and migrated. In the resident state the file data exists only in the live file system 120 (tier 0). No valid copy of the file resides in the back-up server, such as a Spectrum Protect Server (tier 1). This is the migration state for newly created or changed files. In the premigrated state the file data has a valid copy in both the file system 120 (tier 0) and also in the back-up server (tier 1). The premigrated state also applies to a file that was recalled from the back-up server for reading. The HSM file state premigrated is also known as dual-mode. In the migrated state the file in tier 0 was replaced by a stub file and exists in the back-up server (tier 1) only. The migration state persists until a data access is attempted on the file data.

When a file data access is performed a transparent recall is initiated. The data is staged into tier 0 while the data access system call is blocked waiting for it to complete. User recall of files from a lower tier to a higher tier can be performed by either explicit invocation of an HSM command to recall a file or list of files or by use of the a command such as the Spectrum Scale mmapplypolicy command to drive recall of files whose attributes match a set of policy rule criteria. If an application has triggered the recall by accessing the file it has to wait until the complete file data was recalled from the back-up server to the file system 120. The type of the access can be read, write, or truncate.

Reconciliation methods ensure that the file system 120 content and the content at the back-up server are synchronized. Reconciliation functions are implemented by the HSM Client 160 component 160 through a corresponding reconciliation module (illustrated in FIG. 2). For example, in the Spectrum Protect for Space Management client uses the Spectrum Scale policy engine to generate a list of all migrated files in the file system 120 and performs a fast comparison between the files listed and the files stored in the Spectrum Protect Server.

Typical anti-ransomware systems are based on two different architecture types to prevent ransomware from execution.

The first architecture type is a clone of the anti-virus architecture. Anti-ransomware software is installed on the local compute node like an observer. It monitors filesystem data and executed programs for specific signatures of known ransomware. The anti-ransomware software needs to get input of known ransomware software signatures like a virus-scanner needs the latest updates of new viruses. Without the knowledge of the ransomware software signature, it cannot identify, detect and prevent the ransomware software from attacking and encrypting local filesystems.

The second architecture type of anti-ransomware software is based on defining upfront access restrictions to files, directories and filesystems. This software needs to be installed on local compute node and grants specific trusted applications write access to specific areas. For example, directories can be marked as protected and only registered applications are allowed to write data in these directories. This software does not perform any detection of ransomware. It simply defends data from being overwritten by any unknown or untrusted application. This might be ransomware or simply another application the consumer wants to use. Such anti-ransomware software often claims to have a behavior detection inside, but simply gather a lot of feedback from the consumer like typical desktop firewalls ask their consumers if this application is allowed to do this.

Known ransomware detection and prevention applications like Bitdefender, Zone Alarm, Panda or Webroot typically apply the following methodology. Directories can be marked as protected and only registered applications are allowed to write data in these directories. Local file change tracking is used to identify ransomware attacks to files. Applications that were detected as malicious will be stopped by the ransomware detection application on the local system. The limitation of this approach is that the ransomware detection applications have to run on the local system that is attacked. Furthermore, the manual protection of directories introduces inflexibility to the system.

Unlike previous systems the HSM Client 160 of the present disclosure does not have the limitation of having to run on the local system. The file system 120 that is protected can be local but can be remote as well. There is no need to manually identify protected directories. No applications must be stopped, but the file system 120 access will be locked down to prevent further changes to the files.

Figure 2:
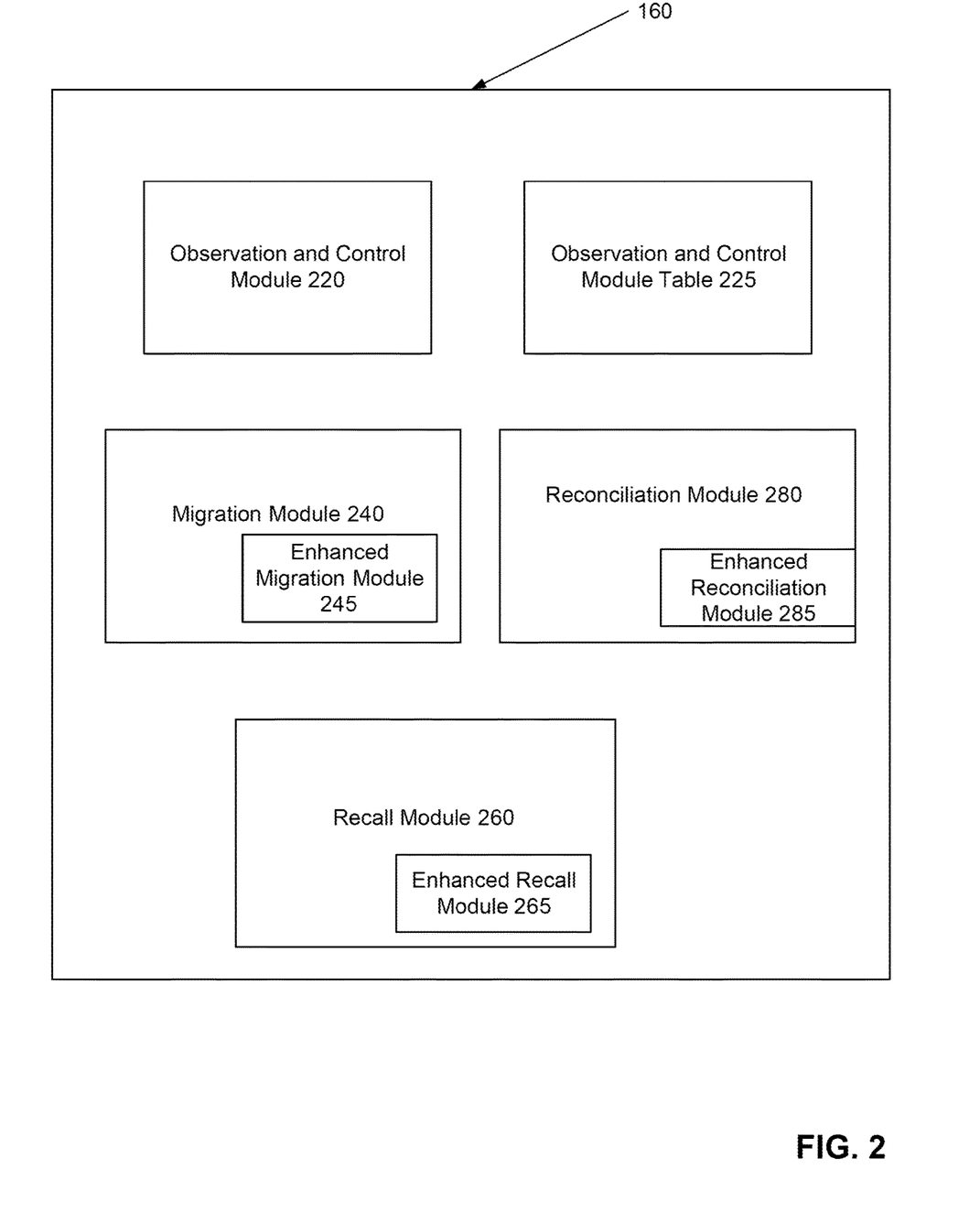
FIG. 2 is a block diagram illustrating the components of the HSM Client in further detail according to illustrative embodiments.

FIG. 2 is a block diagram illustrating the components of the HSM Client 160 in further detail. HSM Client 160 includes an observation and control module 220 (OCM 220), a migration module 240, a recall module 260, and a reconciliation module 280.

The OCM 220 module 220 is a module of the HSM Client 160 that is configured to collect and maintain file access statistics and to collect and maintain file deduplication statistics. The OCM 220 module 220 maintains the collected data in observation and control module table 225 (OCMt 225). The OCM 220 uses file system 120 control interfaces, for example, DMAPI or Windows filter driver to collect file information and to prevent write access to the observed and affected files in the file system 120.

The migration module 240 is a component of the system that is configured to move the file data to the next lower tier and replace the data on the higher tier with only the metadata that is required to identify the new location of the file data in the lower tier for later recall. The migration module 240 includes an enhanced migration module 245 (EMM 245). The EMM 245 is configured to externalize file deduplication and compression rates to the OCM 220 module 220. Furthermore, the EMM 245 is configured to create a block level hash map of a file while migrating it and externalize the hash map to the OCM 220 module 220. The EMM 245 is further configured to migrate the files to the backend server 150 (e.g. Spectrum Protect Server). Backend server 150 is configured with a module to delay deletions until a ransomware infection can be excluded.

The recall module is a component of the system that is configured to move the data back to the higher tier in the storage hierarchy. The recall module 260 includes an enhanced recall module 265 (ERM 265). The ERM 265 is a module that is configured to stop file access to the file system 120.

The reconciliation module 280 is a component of the system that is configured to synchronize file system 120 content with backend server 150 content. The reconciliation module further includes an enhanced filesystem reconcile module 285 (EFRM 285). The EFRM 285 is configured to immediately stop reconcile processing on demand. Furthermore, the EFRM 285 can include an undo-log function.

Figure 3:
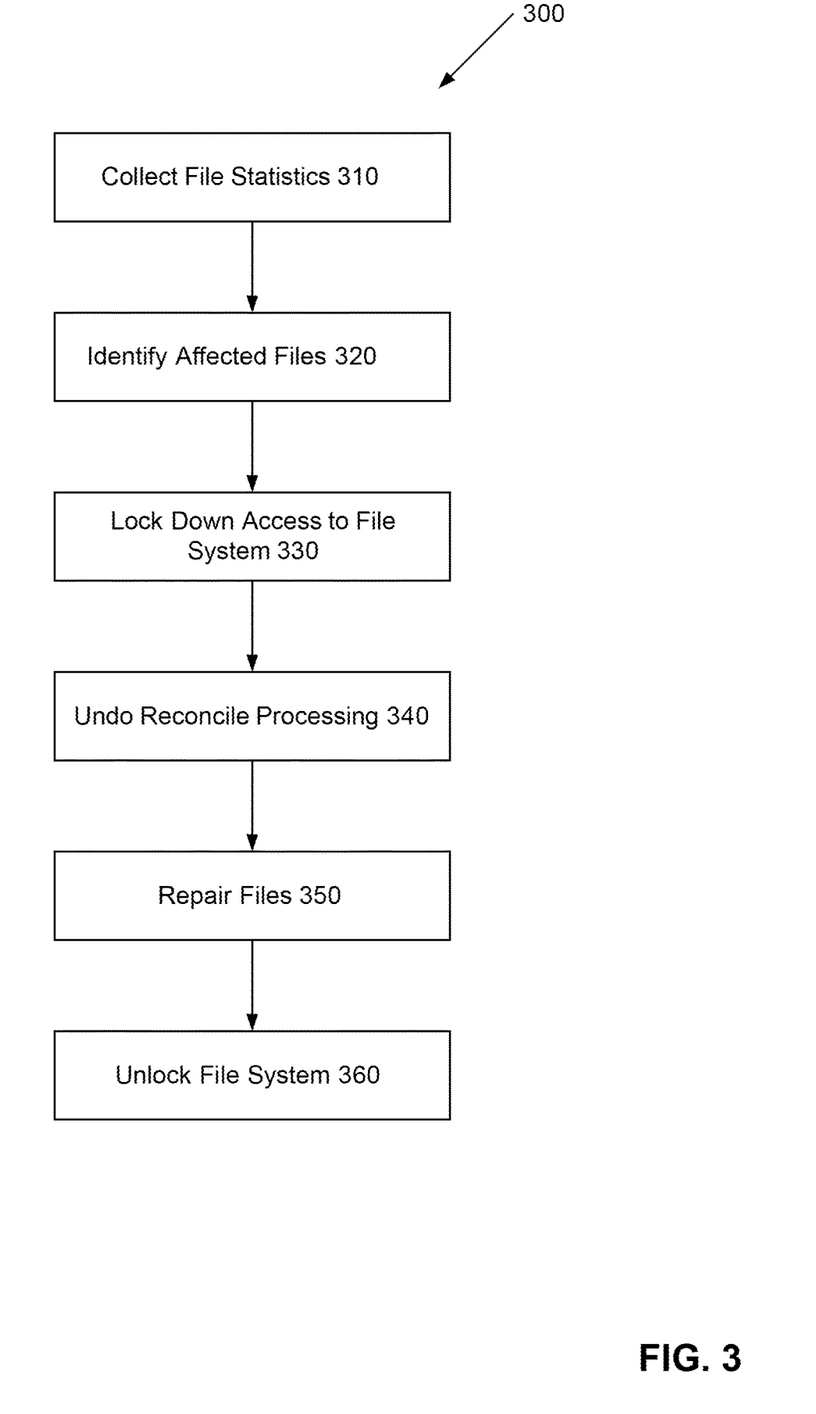
FIG. 3 is a flow diagram illustrating a process for detecting and protecting a system from a ransomware attack according to various embodiments of the present disclosure.

FIG. 3 is a flow diagram illustrating a process for detecting and protecting a system from a ransomware attack according to various embodiments of the present disclosure. Process 300 begins by collecting statistics for the files. This is illustrated at step 310. At this step, the OCM 220 collects file access statistics and file deduplication and compression rates.

To collect the file access statistics the OCM 220 registers with the file system 120 to receive a notification if a new file is created or if an existing file was changed. When the OCM 220 receives a notification about a newly created or changed file it registers a change tracking mechanism at the file to receive notification when a write access happens. When the registration has finished the OCM 220 informs the EMM 245 about the new or changed files and initiates the pre-migration of the file. When the first write access happens the OCM 220 adds the file name to the OCMt 225 and enters the time of the access for the given file. Subsequent write access to the same file in the same observation period will add additional time stamps to the table.

To collect file deduplication and compression rates at the time of the pre-migration the EMM 245 deduplicates and compresses the file for efficient data transfer to the EHS. The EMM 245 calculates the deduplication and compressions rates of the file. Once the pre-migration of the file has finished the EMM 245 informs the OCM 220 that the migration has finished and provides the deduplication and compression rates to the OCM 220. The OCM 220 enters the deduplication and compressions rates for the given file to the OCMt 225. Subsequent migrations will result in additional entries being added for the same file. The same happens when a resident file is not pre-migrated, but migrated. If a pre-migrated file is migrated, no additional information needs to be collected as this was already collected the last time the data was sent to the EHS (at the time of pre-migration).

TABLE 1

| File name | Change time | Compression rate | Dedup rate | Block 0 0x0 | Block 1 0x1 | Block 2 0x2 | Block 3 ... 0x3 | Block ... n ... 0x4 | comment |
|---|---|---|---|---|---|---|---|---|---|
| FileA | t_0 | 2.4 | 1.65 | 0x1234 | 0xabfe | 0x3421 | 0xffee | ... 0x2345 | Initial compress & dedup rate and block level hash map |
| FileA | t_1 | 2.3 | 1.67 | 0x1234 | 0xabfe | 0x3421 | 0xffee | ... 0x1111 | Data from second migration, last block changed and compress&dedup rate only slightly changed |
| FileA | t_2 | 1.2 | 1.01 | 0xdefa | 0x9966 | 0xdefb | 0x2345 | ... 0x1122 | Data from third migration, all blocks changed. Compress and dedup rate close to 1. File is potentially affected |

Table 1 illustrates an example of an entry for a file, FileA, in the OCMt 225 based on the process of steps 310 and 320. It should be noted that the comment column of table 1 is not present in the OCMt 225, but is provided in this example to provide additional information to the reader as what has changed in each entry. In some embodiments the file access statistic is based not just on the frequency of write access to the files but also takes into consideration that the file size doesn't change in terms of the write access. However, file size changes happen when encryption is performed on the file. In some embodiments the process takes into consideration that the access to the files follows a pattern. This pattern can be directory traversal, Mode table traversal, user specific file system 120 traversal or recorded access deny rate. This information can be used to detect abnormal access activity. In some embodiments the file access statistic is based on the recall for write rates of the files. In this embodiment, the OCM 220 interacts the ERM 265 to collect this information and enters the information in the table OCMt 225. This can also be used to identify abnormal access patterns. In some embodiments, the file access statistic is based on the reconcile expire rates of the files. In this approach, the OCM 220 interacts the EFRM 285 to collect this information and enters the information in the table OCMt 225. Again this information can be used to identify abnormal patterns in the system.

Based on the file statistics collected the process proceeds to identify affected files. This is illustrated at step 320. At this step the OCM 220 identifies if a file is affected while it is being sent to the EHS. When the pre-migration of the file happens the first time the EMM 245 creates a block level hash map of the file and send this hash to the OCM 220. The OCM 220 stores the information in the OCMt 225. When the pre-migration of the file happens a second of subsequent time the block level hash map is created and compared to the hash map information stored in the OCMt 225 from a previous run. When the hash map has 100% differences the EMM 245 assumes the file is affected from encryption. The OCM 220 is informed by the EMM 245 that the file is affected. The OCM 220 enters this information in the OCMt 225. However, in some embodiments the percentage of difference in the hash map can be less than 100% for the EMM 245 to assume the file is affected from encryption.

The OCM 220 further identifies if an abnormal amount of file write access is occurring in the file system 120. The OCM 220 traverses the OCMt 225 and build a sum Sn of the write access for all files in the table for the most recent observation cycle. The OCM 220 further builds a second sum Sn−1 of the write accesses for all of the files in the table for the observation cycle prior to the most recent observation cycle. If the result of Sn is significantly higher than the result of Sn−1, process can move to block the access to the file system 120. Alternatively, the OCM 220 can traverse the OCMt 225. For each file in the table accessed in the last observation cycle read the entry for the deduplication and compressions rates. The OCM 220 accesses the file and calculates the current deduplication and compression rates for the given file. If the current deduplication and compression rates are significant lower compared to the most recent deduplication rate the OCM 220 can mark the file for abnormal file access in table OCMt 225.

The OCM 220 can further define a watermark of accepted write access to the files in the file system 120.

An interval is defined in which the OCM 220 is checking for ransomware attacks. This interval is referred to as an observation interval (OI). It can be defined by the administrator and determines how fast the OCM 220 is able to detect an attack. The smaller the OI the faster an attack is detected. However very small intervals bear the risk of false detection. The OI should be much smaller than the usual interval in which the file system 120 is backed up (like 24 h) to benefit from the capabilities of the OCM 220. The OCM 220 runs the file access statistic for the last X OIs, where X OI represent a time span of several days or weeks. The average amount of written files in the file system 120 as well as the distribution of the average are calculated. The OCM 220 then runs the file access statistics for the current OI and calculates the amount of written files in the file system 120. The result from the last X OIs are compared with the result from the current OI. A standard statistical method (e.g. 3 sigma method) is applied to determine whether there is an unusual high file change rate in the current OI. However, any statistical method can be applied. If an unusual high change rate is detected, the OCMt 225 is traversed and identifies all files changed in the last OI. The OCM 220 can then check whether the whole (or other threshold value) file was changed by comparing the block hashed, check whether the deduplication and compression rate has decreased. If the answer to both of these is yes, the OCM 220 can proceed to lock down the access to the file system 120.

When an attack is determined to be underway, the system proceeds to lock down access to the file and/or file system 120. This is illustrated at step 330. At this step the OCM 220 locks write access to files in a file system 120 where abnormal write access has detected. To lock down the file access the OCMt 225 table is traversed. If a predefined number of files are marked as having abnormal write access the OCM 220 proceeds to lock all further write access to complete file system 120 using the ERM 265. This is to prevent more files can be overwritten. The OCM 220 notifies the EMM 245 to stop all migration processing. This is to prevent affected files from being migrated to the backend server 150 and invalidate unaffected versions of the file on the backend server 150. The OCM 220 notifies the EFRM 285 to stop all reconciliation processing. This is to prevent unaffected versions of migrated files from being deleted on the backend server 150. In some embodiments the OCM 220 interacts with virus scanner. The OCM 220 receives notifications from the virus scanner if a file in the observed file system 120 is infected from a virus. The OCM 220 will lock down the write access for the given file and start the automatic repair as described below. In another embodiment the OCM 220 interacts with a virus or malware scanner tool that is automatically started by the OCM 220 when an attack is observed and is used to remove the malware or the virus from the affected system.

Once file access has been locked down the system proceeds to undo the reconcile processing that has already occurred. This is illustrated at step 340. The OCM 220 proceeds to undo reconciliation processing when an abnormal write was detected. When starting the reconcile processing prior to an attack the EFRM 285 writes an undo-log that contains all changes to be reconciled at the backend server 150. The backend server 150 is configured to collect the reconcile activities from the EFRM 285, but not delete files until the EFRM 285 finally committed the reconciliation. The actual deletion only happens several observation cycles after the file has been detected to be obsolete. When the EFRM 285 is stopped from the OCM 220 because of an abnormal write access to the file system 120 the undo-log will be used to undo all reconcile activities at the backend server 150. When the EFRM 285 finishes the reconciliation regularly the changes at the backend server 150 will be committed and the undo-log will be deleted.

Following the stopping of the reconciliation process the system proceeds to repair the files that were damaged by the attack. This is illustrated at step 350.

The OCM 220 automatically repairs affected files by traversing the OCMt 225 to identify files that are marked for abnormal write access. In some embodiments, the OCM 220 then moves the file to a quarantine folder. Then the OCM 220 restores the most recent version of the file from the backend server 150. It does this by identifying the version of the file at the backend server 150 that has a migration time stamp from before the abnormal write access was detected to the original name of the file. This continues for all affected files in the table.

In some embodiments the OCM 220 restores the files by stubbing the affected files. The stub file is then linked to a version of the file at the backend server 150 that was migrated prior to the abnormal write access based on the migration time stamp.

Once the files have been restored the system proceeds to unlock the files that were locked. This is illustrated at step 360. The OCM 220 can unlock the files after a predefined time from either the start of the attack or from the time the files were restored. In some embodiments the unlock process is manually performed by the file system 120 administrator. In some embodiments the OCM 220 may generate a notification to the user informing them of the detected attack. In this way the user can alert the system that the encryption was intentional or not. If the encryption was intentional, the system can proceed to allow the encryption to continue. In some embodiments the user is tasked with identifying and removing the ransomware prior to unlocking the file. The user can then remove the ransomware from the system using a removal tool. Once the ransomware is removed from the system, the user can indicate back to the OCM 220 that the ransomware has been removed and that the file system can be unlocked. In some embodiments, the user may need to remove the ransomware prior to the restoration of the affected files.

Figure 4:
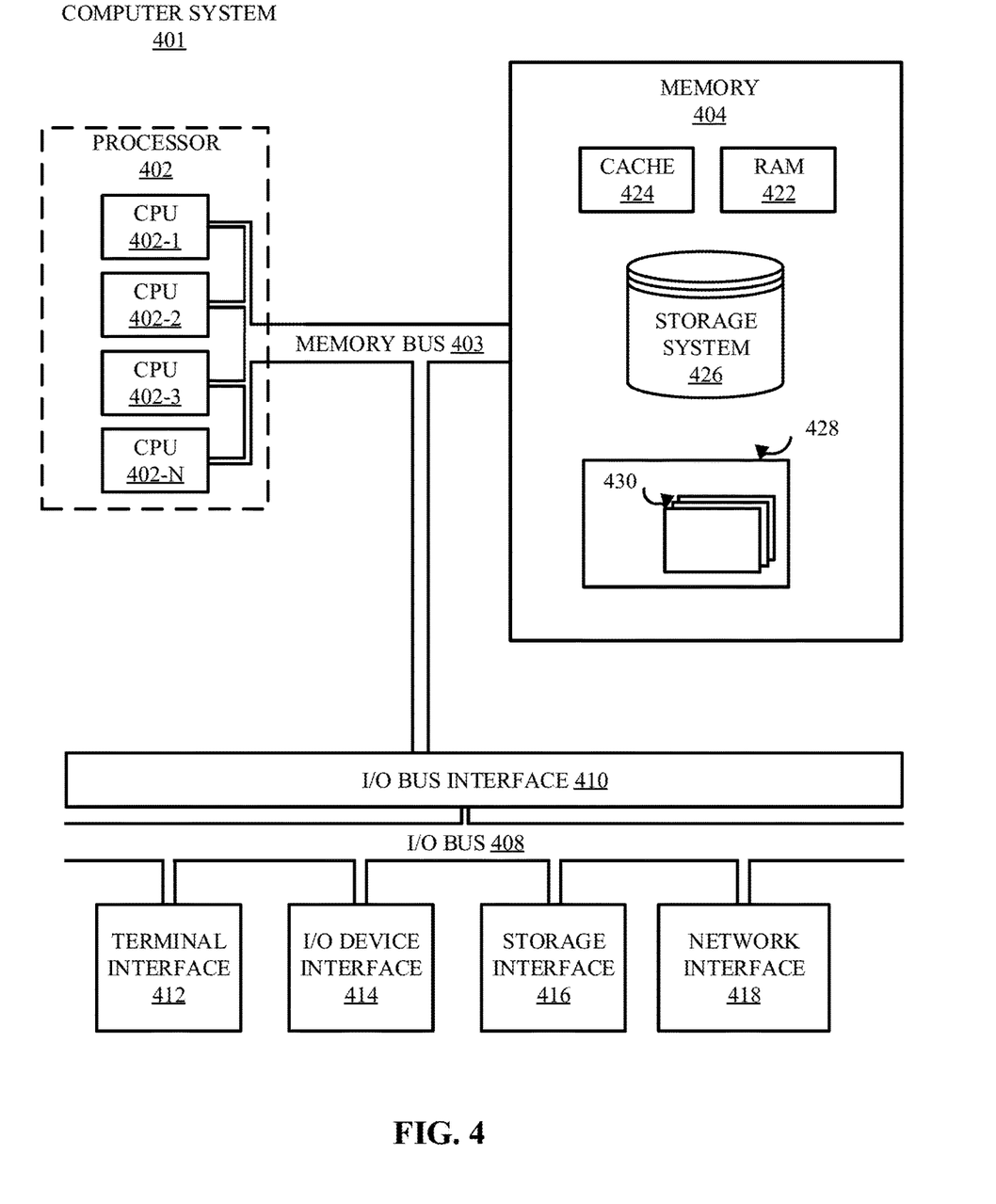
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, and 402-N, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 403 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
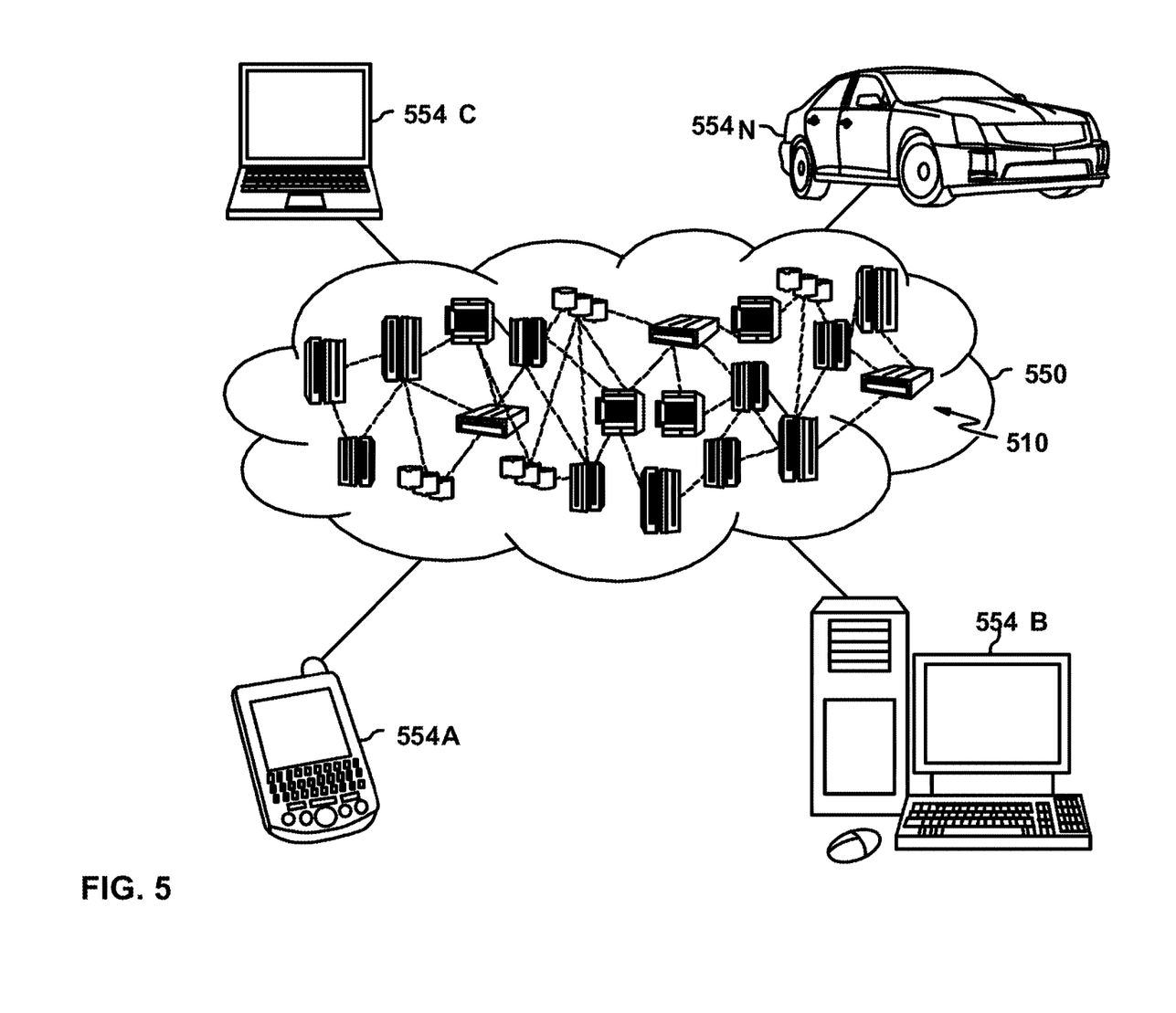
FIG. 5 is a diagrammatic representation of an illustrative cloud computing environment.

The system 600 may be employed in a cloud computing environment. FIG. 5 is a diagrammatic representation of an illustrative cloud computing environment 550 according to one embodiment. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 9Y may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 may communicate with any type of computerized device over any type of network and/or network addressable connection (e.g., using a web browser).

Figure 6:
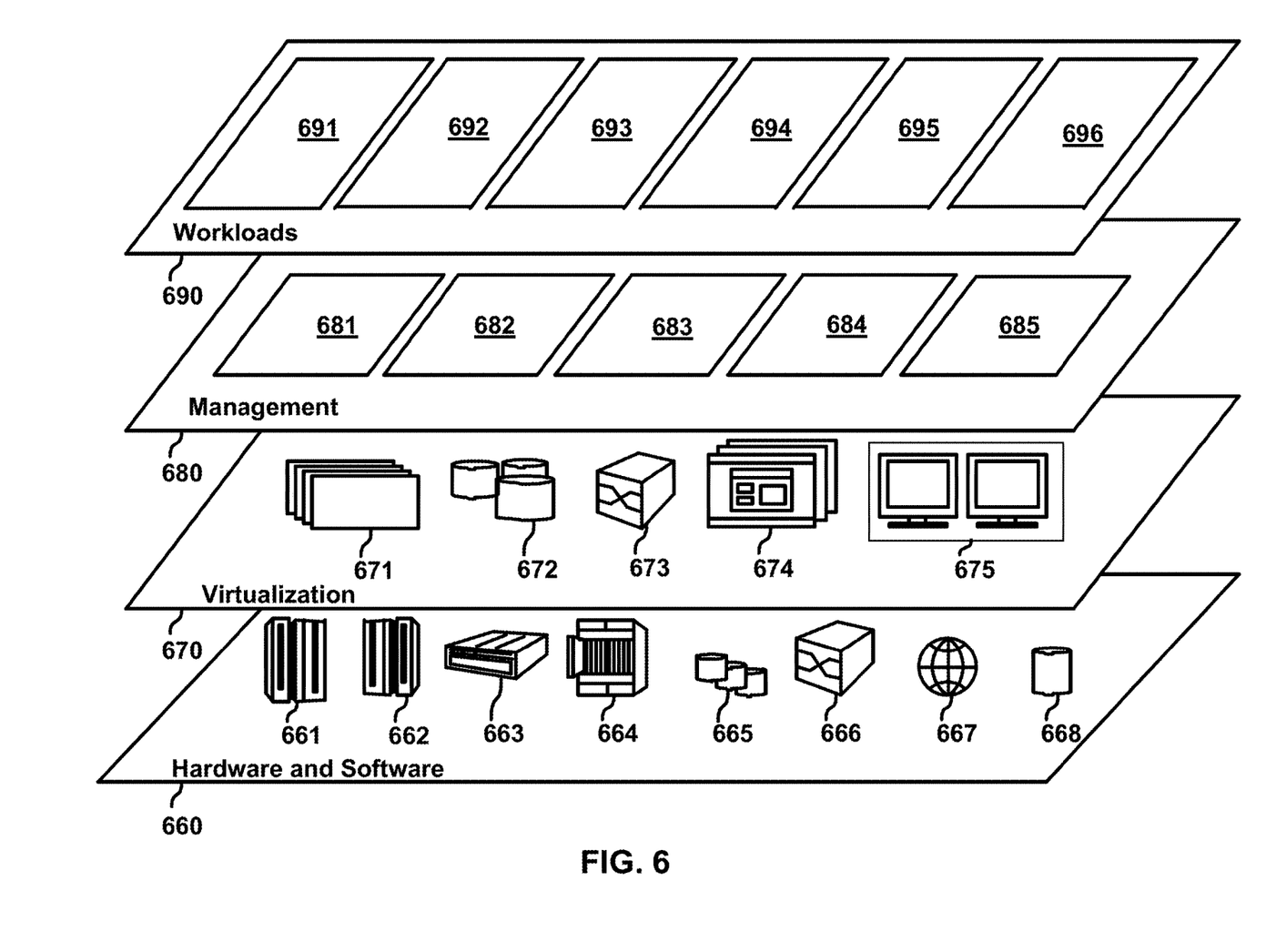
FIG. 6 illustrates a set of functional abstraction layers provided by cloud computing environment according to one illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; layout detection 693; data analytics processing 694; transaction processing 695; and database 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for detecting ransomware comprising:
collecting file statistics for files in a file system;
identifying one or more affected files based on collected file statistics;
locking down of access to the file system in response to identifying the one or more affected files;
undoing of reconcile processing;
repairing the one or more affected files;
unlocking access to the file system;
wherein identifying the one or more affected files further comprises:
defining a watermark of accepted write access to the files in the file system; and
wherein defining the watermark of accepted write access to the files in the file system further comprises:
defining an observation interval in which an operation and control module checks for a ransomware attack;
calculating an average amount of written files in the file system over a predetermined number of observation intervals;
calculating a distribution of the average amount;
calculating an amount of files written for a current observation interval;
comparing the amount of files written for the current observation interval with the calculated average;
determining whether the amount of files written for the current observation interval exceeds a predetermined rate of change as comparted to the calculated average; and
when the predetermined rate of change is exceeded:
traversing an observation and control module table (OCMt) to identify all files that were changed in a previous observation interval;
for each file that was changed, determining whether the entire file was changed, and whether a deduplication and compression rate decreased; and
determining that the file is an affected file when the determining is positive.

2. The method of claim 1 wherein identifying an affected file further comprises:
generating a block level hash map of a file at a time of first pre-migration of the file;
storing the block level hash map of the file in an observation and control module table (OCMt);
generating a second block level hash map of the file at a time of a second pre-migration of the file;
comparing the block level hash map with the second block level hash map;
determining that a predetermined portion of the compared block level hash maps do not match; and
in response to determining identifying the file as affected.

3. The method of claim 1 wherein identifying an affected file further comprises:
determining if an abnormal amount of file write accesses have occurred to the file system.

4. The method of claim 3 wherein determining if an abnormal amount of file write accesses have occurred to the file system further comprises:
traversing an observation and control module table (OCMt);
building a sum of write accesses for files in the OCMt for a most recent observation cycle;
building a sum of write access for the files in the OCMt for an observation cycle prior to the most recent observation cycle.

5. The method of claim 3 wherein determining if an abnormal amount of file write access have occurred to the file system further comprises:
traversing an observation and control module table (OCMt);
for each file in the table accessed in a previous observation cycle, reading an associated deduplication and compression rate entry for each file from the OCMt as a most recent rate;
for each file, calculating a current deduplication and compression rate for the associated file as a current rate;
comparing the current rate for each file with most recent rate for the corresponding file from the previous observation cycle; and
determining that the associated file has abnormal file access when the current rate is lower than the most recent rate.

6. The method of claim 1 wherein identifying an affected file further comprises:
determining if an abnormal amount of file write accesses have occurred to the file system; and
defining the watermark of accepted write access to the files in the file system.

7. The method of claim 1 wherein locking down access to the file system in response to identifying the one or more affected files further comprises:
traversing an observation and control module table (OCMt) to determine if a threshold number of files have been marked as an affected file;
blocking further write accesses to the file system;
stopping by an enhanced migration module (EMM) all migration processing; and
stopping by an enhanced filesystem reconcile module (EFRM) all reconcile processing.

8. The method of claim 1 wherein undoing of reconcile processing further comprises;
writing by an enhanced filesystem reconcile module (EFRM) an undo log of changes to reconciled;
determining that reconcile processing at the EFRM has been stopped; and
applying the undo log to undo all reconcile activities at a storage server.

9. The method of claim 1 wherein repairing the one or more affected files further comprises:
traversing an observation and control module table (OCMt) to identify each file in the OCMt that is marked as an affected file;
moving the one or more affected files to a quarantine folder; and
restoring a most recent version of the one or more affected files from a storage server having a migration time stamp prior to a time stamp associated with current versions of the one or more affected files.

10. The method of claim 1 wherein repairing the one or more affected files further comprises:
- traversing an observation and control module table (OCMt) to identify each file in the OCMt that is marked as an affected file; stubbing each of the affected files; and
- linking the stubbed version of each of the affected files to a version of the affected file in a storage server that was migrated prior to a timestamp associated with a current version of the affected file.

11. A computer readable storage medium having computer executable instructions that when executed cause at least one processing unit to:
- collect file statistics for files in a file system;
- identify one or more affected files based on collected file statistics;
- lock down of access to the file system in response to identifying the one or more affected files;
- undo of reconcile processing;
- repair the one or more affected files;
- unlocking access to the file system;
- wherein identify one or more affected files further comprises instructions to:
- define a watermark of accepted write access to the files in the file system; and
- wherein define the watermark of accepted write access to the files in the file system further comprises instructions to:
- define an observation interval in which an operation and control module checks for a ransomware attack;
- calculate an average amount of written files in the file system over a predetermined number of observation intervals;
- calculate a distribution of the average amount;
- calculate an amount of files written for a current observation interval;
- compare the amount of files written for the current observation interval with the calculated average;
- determine whether the amount of files written for the current observation interval exceeds a predetermined rate of change as comparted to the calculated average; and
- when the predetermined rate of change is exceeded:
- traverse an observation and control module table (OCMt) to identify all files that were changed in a previous observation interval;
- for each file that was changed, determine whether the entire file was changed, and whether a deduplication and compression rate decreased; and
- determine that the file is an affected file when the determining is positive.

12. The computer readable storage medium of claim 11 wherein identify the one or more affected files further comprises instructions to:
- generate a block level hash map of a file at a time of first pre-migration of the file;
- store the block level hash map of the file in an observation and control module table (OCMt);
- generate a second block level hash map of the file at a time of a second pre-migration of the file;
- compare the block level hash map with the second block level hash map;
- determine that a predetermined portion of the compared block level hash maps do not match; and
- in response to determining, identify the file as affected.

13. The computer readable storage medium of claim 11 wherein identify the one or more affected files further comprises instructions to:
- determine if an abnormal amount of file write accesses have occurred to the file system.

14. The computer readable storage medium of claim 13 wherein determine if an abnormal amount of file write accesses have occurred to the file system further comprises instructions to:
- traverse an observation and control module table (OCMt);
- build a sum of write accesses for files in the OCMt for a most recent observation cycle;
- build a sum of write access for the files in the OCMt for an observation cycle prior to the most recent observation cycle.

15. The computer readable storage medium of claim 13 wherein determine if an abnormal amount of file write access have occurred to the file system further comprises instructions to:
- traverse an observation and control module table (OCMt);
- for each file in the table accessed in a previous observation cycle, read an associated deduplication and compression rate entry for each file from the OCMt as a most recent rate;
- for each file, calculate a current deduplication and compression rate for the associated file as a current rate;
- compare the current rate for each file with most recent rate for the corresponding file from the previous observation cycle; and
- determine that the associated file has abnormal file access when the current rate is lower than the most recent rate.

16. The computer readable storage medium of claim 11 wherein lock down of access to the file system in response to identifying the affected file further comprises instructions to:
- traverse an observation and control module table (OCMt) to determine if a threshold number of files have been marked as an affected file;
- block further write accesses to the file system;
- stop by an enhanced migration module (EMM) of all migration processing; and
- stop by an enhanced filesystem reconcile module (EFRM) all reconcile processing.

* * * * *